US012519372B2

(12) United States Patent
Stanke et al.

(10) Patent No.: US 12,519,372 B2
(45) Date of Patent: Jan. 6, 2026

(54) PASS-THROUGH BRUSHLESS MOTOR

(71) Applicant: MILWAUKEE ELECTRIC TOOL CORPORATION, Brookfield, WI (US)

(72) Inventors: Zachary G. Stanke, Wausau, WI (US); Daniel M. Blau, Milwaukee, WI (US); Christopher J. Kujawski, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 284 days.

(21) Appl. No.: 18/479,407

(22) Filed: Oct. 2, 2023

(65) Prior Publication Data

US 2024/0113593 A1   Apr. 4, 2024

Related U.S. Application Data

(60) Provisional application No. 63/411,708, filed on Sep. 30, 2022.

(51) Int. Cl.
| | |
|---|---|
| *H02K 7/14* | (2006.01) |
| *H02K 11/00* | (2016.01) |
| *H02K 21/16* | (2006.01) |
| *B23D 49/16* | (2006.01) |
| *B23D 51/16* | (2006.01) |

(52) U.S. Cl.
CPC ......... *H02K 7/145* (2013.01); *H02K 11/0094* (2013.01); *H02K 21/16* (2013.01); *B23D 49/16* (2013.01); *B23D 51/16* (2013.01)

(58) Field of Classification Search
CPC .............................. H02K 7/145; H02K 21/16

USPC .......................................................... 310/50
See application file for complete search history.

(56) References Cited

U.S. PATENT DOCUMENTS

| | | | |
|---|---|---|---|
| 3,105,162 A | | 9/1963 | Stevenson |
| 3,802,079 A | * | 4/1974 | Ketchpel, Jr. .......... B23D 51/16 |
| | | | 30/376 |
| 3,832,772 A | * | 9/1974 | Sumida ................ B23D 49/162 |
| | | | 30/277.4 |
| 7,168,929 B2 | | 1/2007 | Siegel et al. |
| 7,317,273 B2 | | 1/2008 | Yanagisawa |
| 11,139,725 B2 | | 10/2021 | Latulipe |

(Continued)

FOREIGN PATENT DOCUMENTS

| | | | |
|---|---|---|---|
| CN | 106357047 A | 1/2017 | |
| CN | 114069923 A | 2/2022 | |
| WO | WO-2019033875 A1 * | 2/2019 | ............... B27B 9/00 |

*Primary Examiner* — Jose A Gonzalez Quinones
(74) *Attorney, Agent, or Firm* — Michael Best & Friedrich LLP

(57) ABSTRACT

A power tool includes a housing, a rechargeable battery pack coupled to the housing, and a motor supported by the housing. The motor includes a stator assembly having a stator frame with an opening extending therethrough and a plurality of coil windings configured to be selectively powered by the rechargeable battery pack. The coil windings are positioned adjacent the opening of the stator frame. The motor further includes a rotor assembly disposed within the stator assembly and configured to rotate as the coil windings are powered by the rechargeable battery pack. Moreover, the power tool includes an output drive assembly supported by the housing. The output drive assembly extends through the opening of the stator frame to be operably coupled to the rotor assembly.

21 Claims, 8 Drawing Sheets

(56) References Cited

U.S. PATENT DOCUMENTS

2010/0162579 A1* 7/2010 Naughton ............. B23D 49/16
30/392
2018/0193932 A1* 7/2018 Gall ....................... B23D 51/01

* cited by examiner

PASS-THROUGH BRUSHLESS MOTOR

CROSS-REFERENCE TO RELATED APPLICATIONS

The present application claims priority to U.S. Provisional Patent Application No. 63/411,708, filed Sep. 30, 2022, the entire content of which is incorporated herein by reference.

FIELD

The present disclosure relates to brushless motors, and more particularly to brushless motors for use in power tools.

BACKGROUND

Power tools generally include a motor connected to a power source to power the tool. The motor may be a brushless DC motor that uses electronically controlled switches to selectively apply power from a power source to coils of a motor to drive a rotor for rotation.

SUMMARY

The present disclosure provides, in one aspect, a power tool including a housing, a rechargeable battery pack coupled to the housing, and a motor supported by the housing. The motor includes a stator assembly having a stator frame with an opening extending therethrough and a plurality of coil windings configured to be selectively powered by the rechargeable battery pack. The plurality of coil windings are positioned adjacent the opening of the stator frame. The motor further includes a rotor assembly disposed within the stator assembly and configured to rotate as the plurality of coil windings are powered by the rechargeable battery pack. Moreover, the power tool includes an output drive assembly supported by the housing. The output drive assembly extends through the opening of the stator frame to be operably coupled to the rotor assembly.

The present disclosure provides, in another aspect, a power tool including a housing including a motor housing portion and a handle housing portion, a rechargeable battery pack coupled to the handle housing portion, and a motor defining a motor axis and supported by the motor housing portion. The motor includes a stator assembly forming a central bore. The stator assembly includes a stator frame and a plurality of coil windings configured to be selectively powered by the rechargeable battery pack. The stator frame includes an opening extending therethrough in a direction perpendicular to the motor axis. The motor further includes a rotor assembly extending through the central bore of the stator assembly and configured to rotate as the plurality of coil windings are powered by the rechargeable battery pack. The rotor assembly includes a first rotor portion and a second rotor portion with a gap defined therebetween. Moreover, the power tool includes an output drive assembly supported by the motor housing portion and defining an output drive axis oriented perpendicular to the motor axis. The output drive assembly extends through the opening of the stator frame and is at least partially disposed within the gap to be operably coupled to the rotor assembly.

The present disclosure provides, in another aspect, a power tool including a housing, a rechargeable battery pack coupled to the housing, and a motor supported by the housing and configured to be selectively powered by the rechargeable battery pack for rotation. The motor includes a stator assembly including a stator frame having an opening extending therethrough and a plurality of coil windings. The plurality of coil windings includes a first coil winding and a second coil winding that are disposed on opposite sides of the opening. The motor further includes a rotor assembly disposed within the stator assembly and configured to rotate as the plurality of coil windings are powered by the rechargeable battery pack. Moreover, the power tool includes an output drive assembly supported by the housing. The output drive assembly extends through the opening of the stator assembly and past the first and second coil windings to be operably coupled to the rotor assembly for reciprocating motion in a direction perpendicular to the motor.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
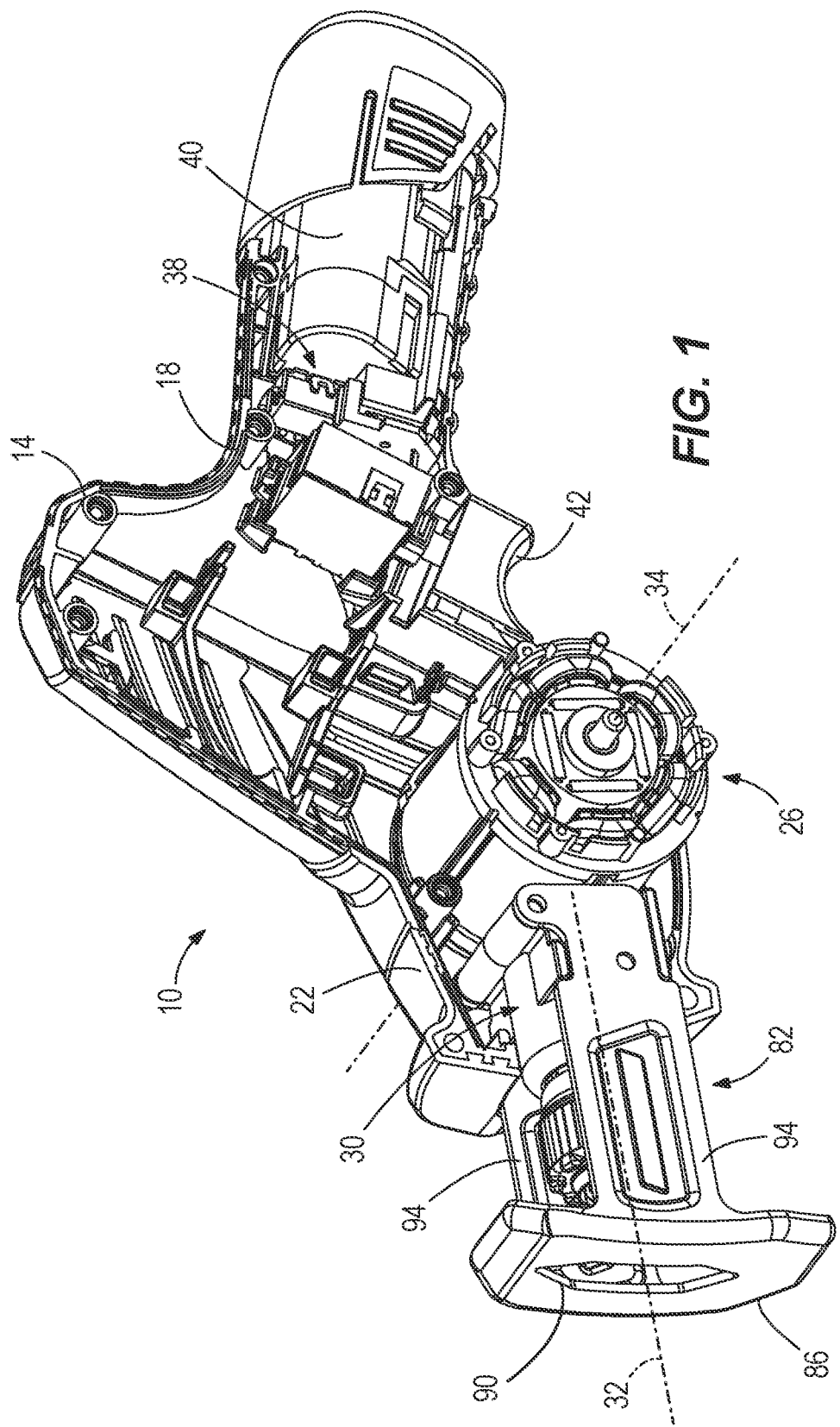
FIG. 1 is a perspective view of a power tool according to an embodiment of the present disclosure, with portions removed to illustrate a motor and an output drive assembly of the power tool.

FIG. 1 illustrates a power tool 10 in the form of a portable reciprocating saw. The power tool 10 includes a housing 14 having a handle portion 18 and a motor housing portion 22, a motor 26 supported within the motor housing portion 22 of the housing 14, and an output drive assembly 30 operably coupled to the motor 26. A tool element (not shown), such as a reciprocating saw blade, is coupled to the output drive assembly 30 to be driven with the output drive assembly 30 to perform cutting operations. In particular, the tool element may reciprocate with the output drive assembly 30. In the illustrated embodiment, the output drive assembly 30 defines an output drive axis 32 extending generally in a longitudinal direction of the power tool 10, and the motor 26 defines a motor axis 34 oriented perpendicular to the output drive axis 32. The motor 26 is operable to reciprocate the output drive assembly 30 along the output drive axis 32.

In the illustrated embodiment, the power tool 10 includes a battery receptacle 38 formed within the handle portion 18 of the housing 14. The battery receptacle 38 forms a cavity and is configured to receive a battery pack 40. When the battery pack 40 is inserted into the battery receptacle 38, the battery pack 40 becomes electrically connected to the motor 26 via suitable electrical and electronic components, such as a PCBA (not shown). In some embodiments, the battery pack 40 may be a 12V lithium-ion battery pack including three battery cells connected in series. In other embodiments, the battery pack 40 may be a 14.4-volt power tool battery pack or an 18-volt power tool battery pack including fewer or more battery cells. Additionally, or alternatively, the battery cells may include chemistries other than lithium-ion such as, for example, nickel cadmium, nickel metal-hydride, or the like. A trigger switch 42 is coupled to the handle housing portion 18 of the housing 14. The trigger switch 42 is configured to be depressed by a user to operate the power tool 10 (e.g., energize the motor 26, de-energize the motor 26, and optionally control an operating speed of the motor 26).

Referring to FIG. 1, the power tool 10 further includes a shoe assembly 82 fixed within the motor housing portion 22 of the housing 14. The shoe assembly 82 includes a front surface or plate 86 defining an opening 90 configured to receive the tool element. During operation of the power tool 10, the plate 86 can engage or rest upon a workpiece. As the tool element is received within the opening 90 of the plate 86, a blade clamp 54 (FIG. 2) is configured to be adjusted by a user to fix the tool element within the power tool 10. The shoe assembly 82 further includes two connecting members 94 for connecting the shoe assembly 82 to the motor housing portion 22 of the housing 14. In some embodiments, the shoe assembly 82 may be an adjustable shoe assembly or a pivoting shoe assembly.

FIGS. 2-5 illustrates the output drive assembly 30 and the motor 26 in greater detail. The output drive assembly 30 includes an output shaft 46 operably coupled to the motor 26, a yoke 50 fixed to (and in some embodiments, integrally formed with) the output shaft 46 (FIG. 3), and the blade clamp 54 coupled to the output shaft 46. In some embodiments, the output drive assembly 30 can additionally or alternatively include, but is not limited to, a belt and pulley assembly, a gear train arrangement, a chain and sprocket arrangement, a hydraulic drive arrangement, or the like. That is, it should be understood that the output drive assembly 30 described and illustrated herein is one example of an output drive assembly able to be driven by the motor 26, and the motor 26 may be used in other applications.

In the illustrated embodiment, the output shaft 46 includes a pair of slots 52 positioned opposite each other along the output shaft 46. The pair of slots 52 receives a securing pin 58 (FIG. 3) that movably couples the output shaft 46 and the blade clamp 54 together. The yoke 50 includes a U-shaped body 60 forming a recess 62 extending perpendicular to the output drive axis 32.

The output drive assembly 30 further includes a pin 64 extending through the U-shaped body 60 of the yoke 50 and a bearing 66 configured to receive and rotatably support the pin 64. The bearing 66, as well as the pin 64, is positioned within the recess 62 of the U-shaped body 60 of the yoke 50. The pin 64 is also coupled to a rotor 106 of the motor 26, thereby coupling the output drive assembly 30 to the rotor 106. The pin 64 is offset from a rotational axis of the rotor 106 or the motor axis 34 such that the yoke 50 converts eccentric rotation of the pin 64 into reciprocating movement of the output shaft 46. In the illustrated embodiment, the output shaft 46 of the output drive assembly 30 is coupled to a central portion of the rotor 106. However, the output shaft 46 can be operably coupled to the rotor 106 at any specific location along a length of the rotor 106. In other embodiments, the output drive assembly 30 may include multiple output shafts that are coupled to the rotor 106 at different locations along the length of the rotor 106. The multiple output shafts may extend from the motor 26 in different directions (e.g., opposite directions).

Figure 2:
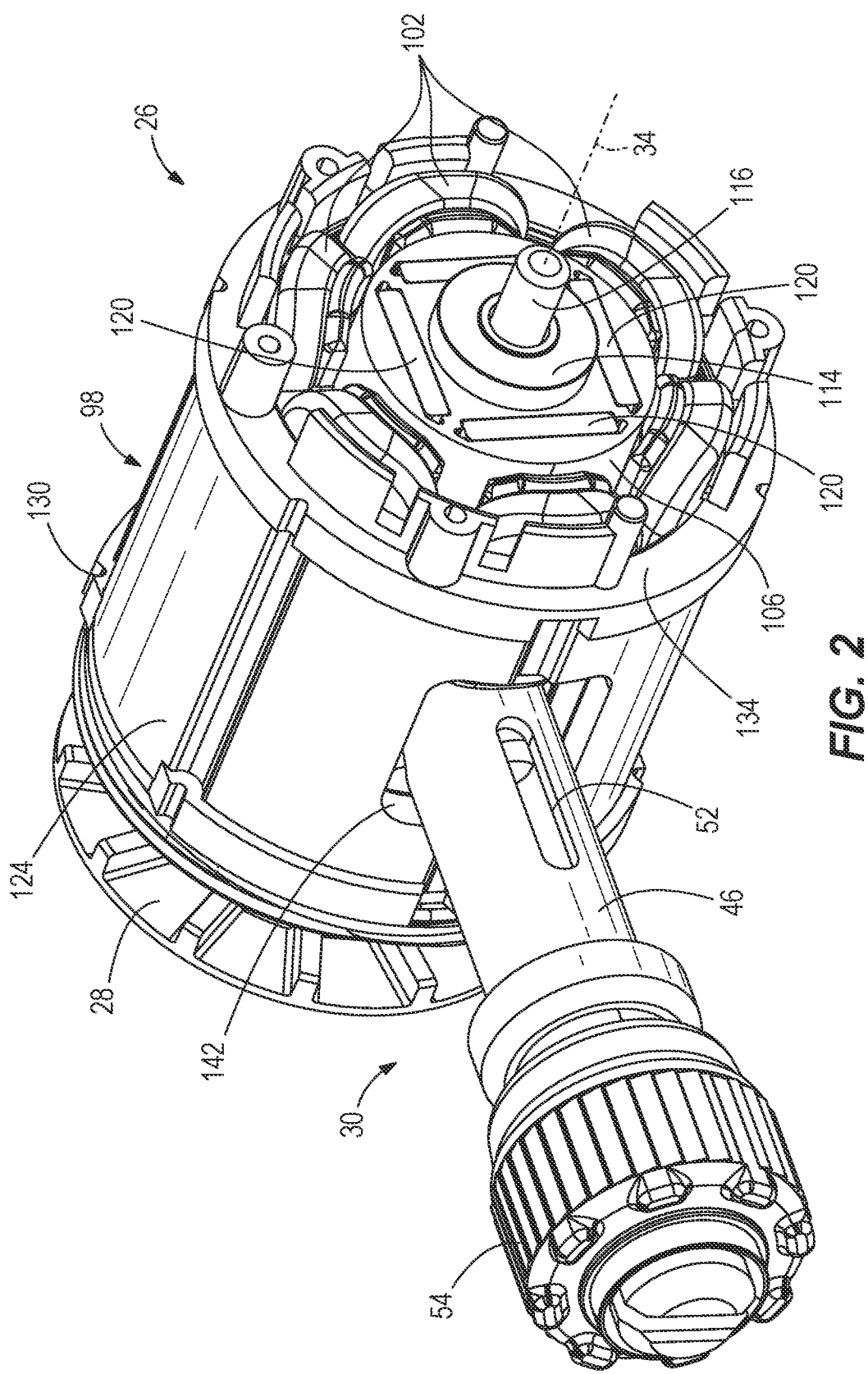
FIG. 2 is a perspective view of the motor and the output drive assembly of the power tool of FIG. 1.

Referring to FIG. 2, the motor 26 is a brushless DC motor and includes a stator 98 having a plurality of coil windings 102, a rotor 106 supported inside the stator 98, a front bearing 114 supported by a first motor shaft 116 (FIG. 2), and a rear rotor bearing (not shown). The illustrated power tool 10 further includes an impeller 28 rotatably coupled to the rotor 106 by a second motor shaft 118 (FIG. 4) for generating a cooling airflow to cool the motor 26. In other embodiments, the motor 26 may be an outer rotor brushless DC motor including a rotor generally surrounding a stator. The rotor is an outer rotor and the stator is an inner stator that is at least partially received within and generally surrounded by the outer rotor. The outer rotor rotates relative to the inner stator about the motor axis 34.

Figure 3:
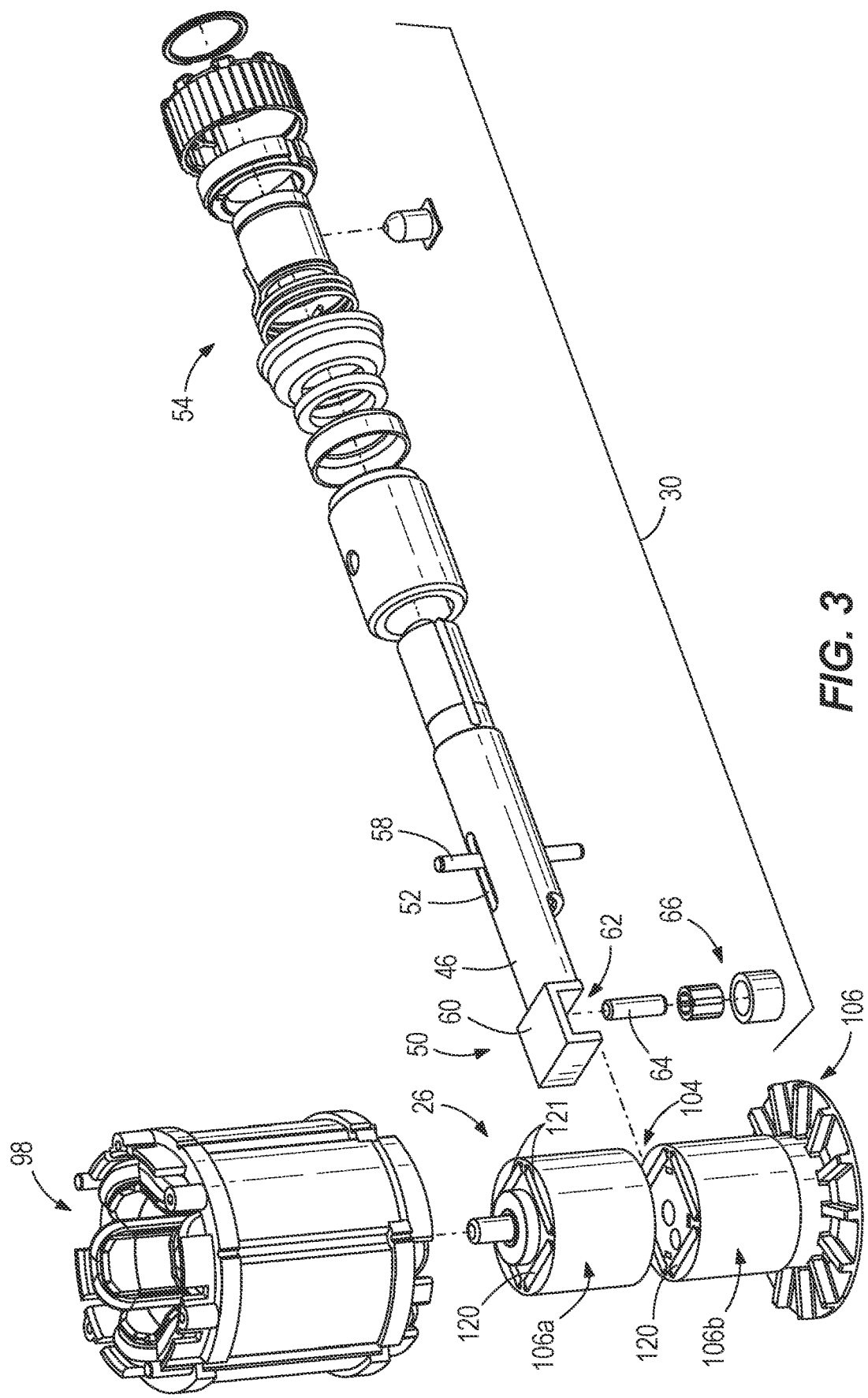
FIG. 3 is an exploded view of the motor and the output drive assembly of the power tool of FIG. 1.
Figure 4:
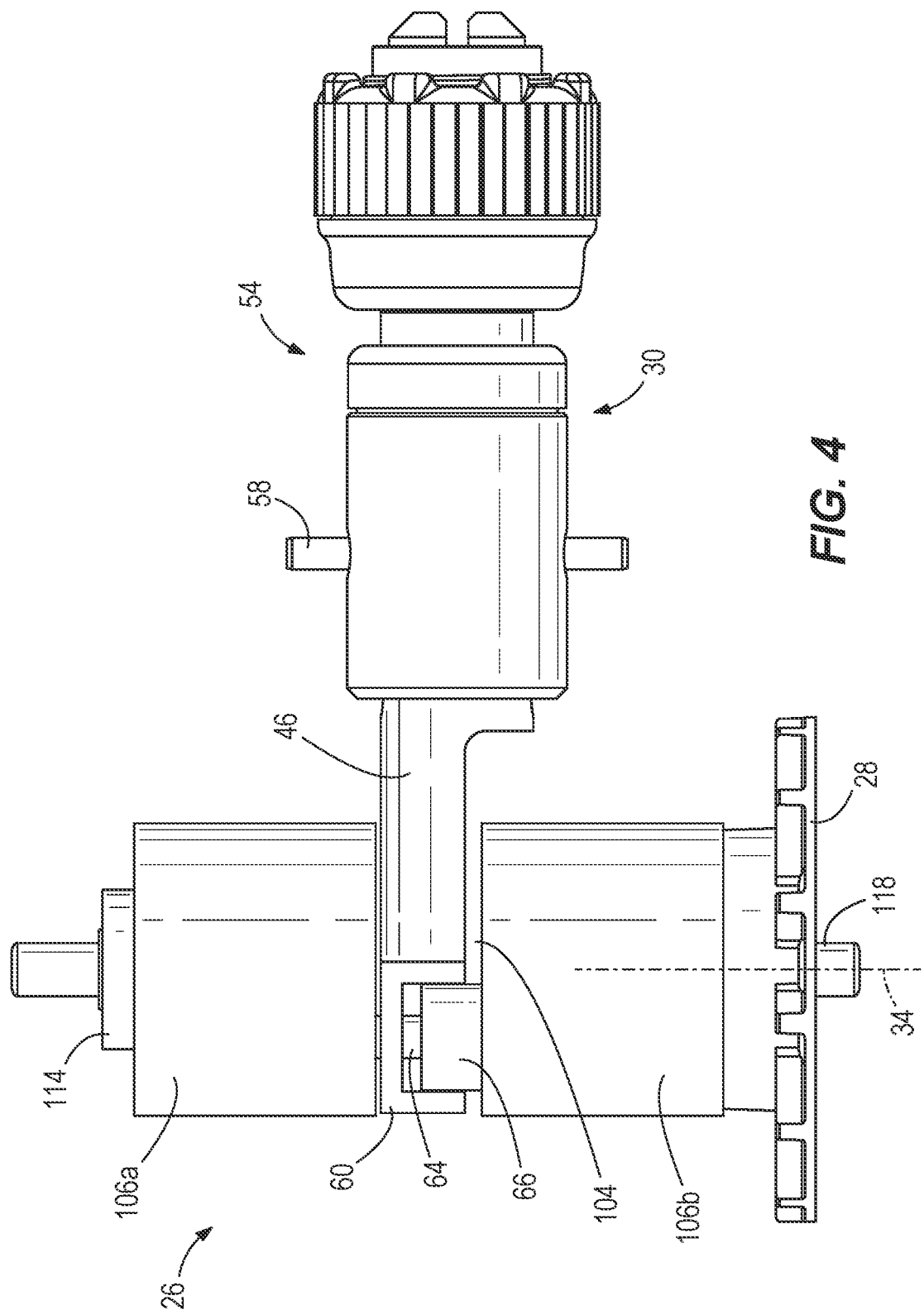
FIG. 4 is a top view of the motor and the output drive assembly of FIG. 1 with portions removed.
Figure 5:
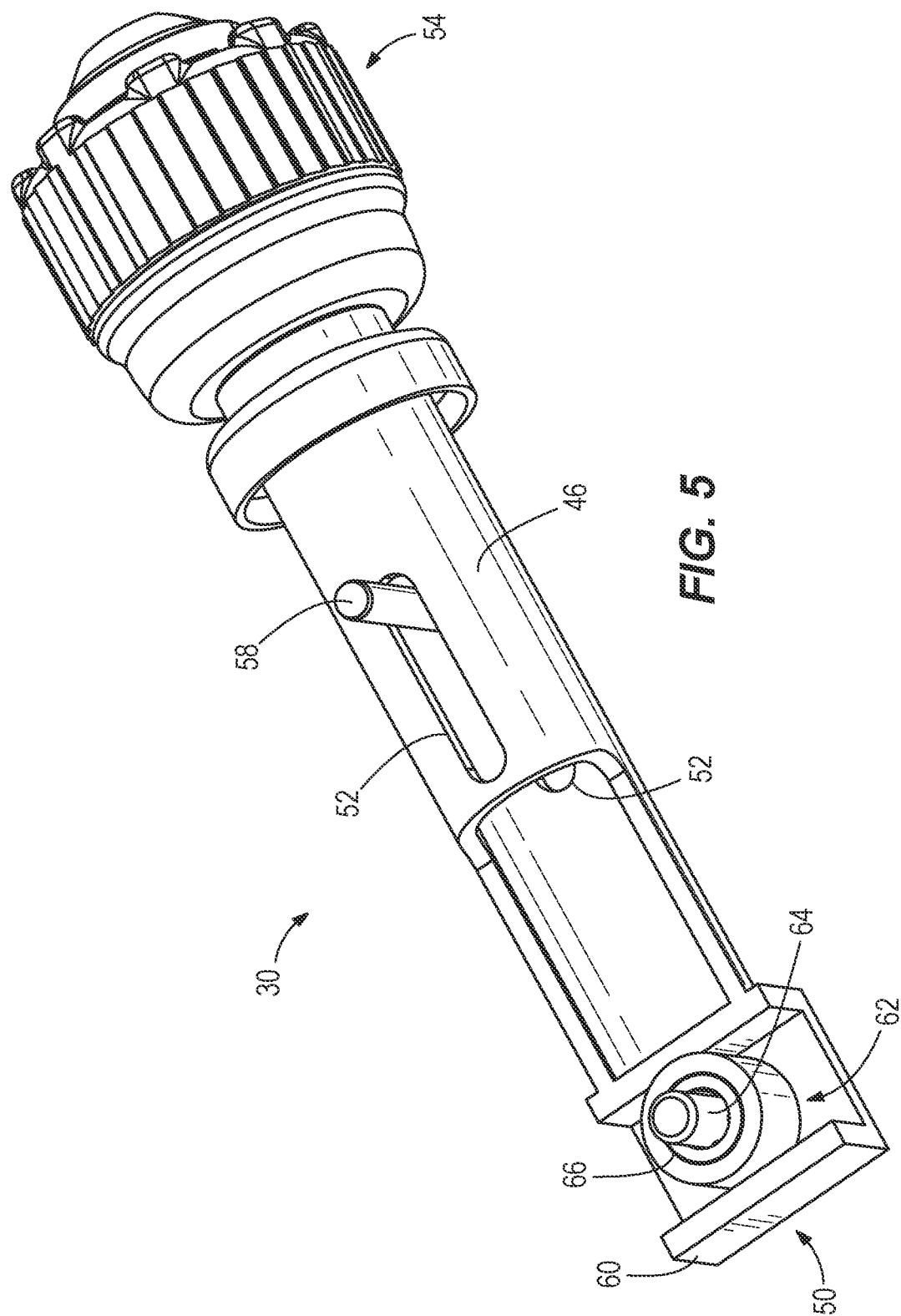
FIG. 5 is a perspective view of the output drive assembly of the power tool of FIG. 1, with portions removed.

Referring to FIGS. 3-4, in the illustrated embodiment, the rotor 106 includes a first rotor portion 106a and a second rotor portion 106b with a gap 104 defined therebetween. The first and second rotor portions 106a, 106b are interconnected by the pin 64 disposed within the gap 104, thereby operably coupling the output shaft 46 to the first and second rotor portions 106a, 106b. The first and second rotor portions 106a, 106b each form a cylindrical core having rotor laminations (not shown). A plurality of magnets 120 is fixed within slots 121 formed in the laminations of each of the first and second rotor portions 106a, 106b. The coil windings 102 are selectively powered by the battery pack 40 to drive the rotor 106 to rotate about the motor axis 34, thereby driving the output shaft 46 to reciprocate.

Figure 6:
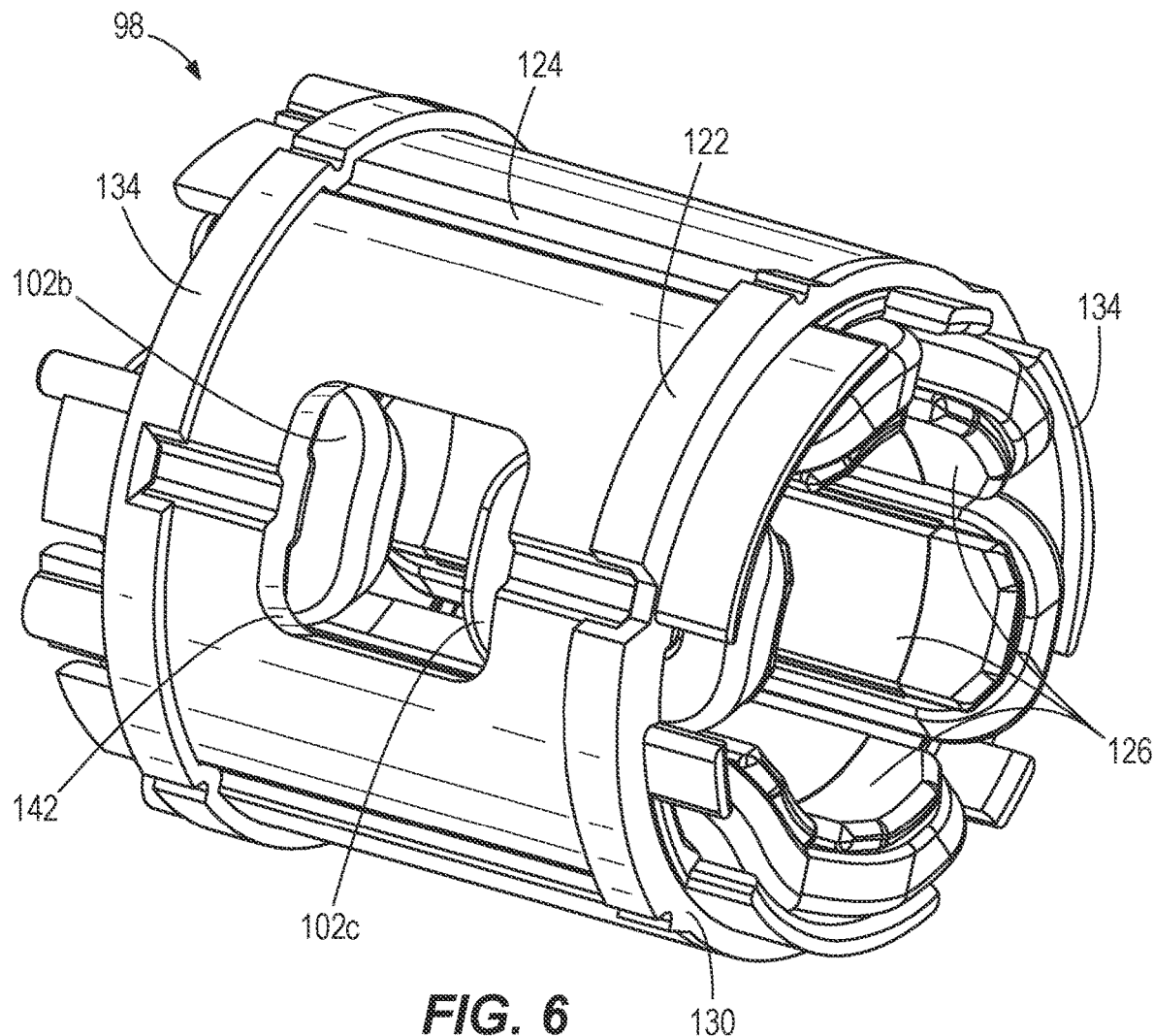
FIG. 6 is a front perspective view of a stator of the motor of FIG. 1 including a plurality of coil windings.
Figure 7:
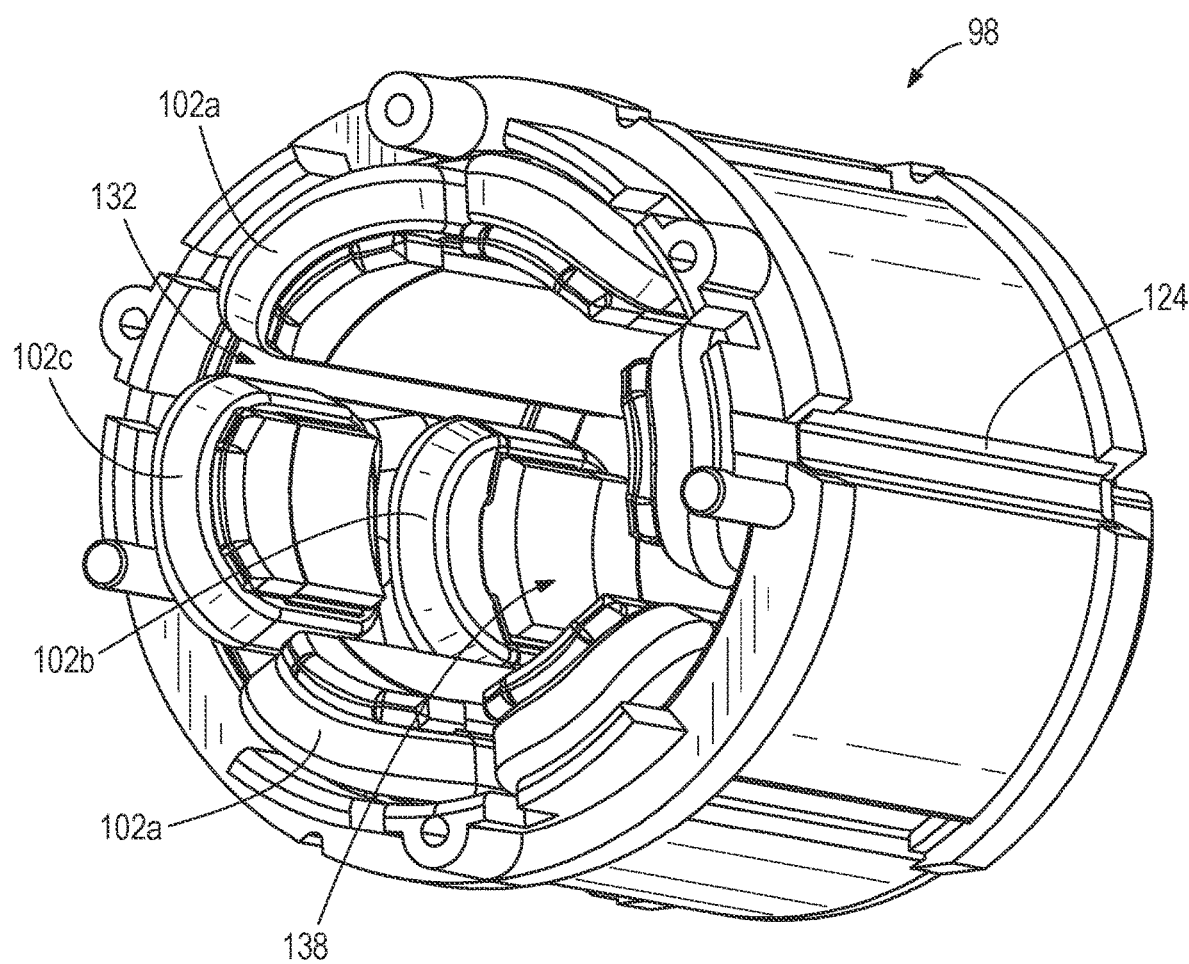
FIG. 7 is a rear perspective view of the stator of FIG. 6.

Illustrated in FIGS. 6 and 7, the stator 98 further includes a stator frame 122 that may be formed by an injection molding process, for example, by injecting resin material into a mold including a stator lamination stack. The stator frame 122 supports a stator lamination stack 124 such that the stator frame 122 and the stator lamination stack 124 form stator teeth 126 around which the coil windings 102 are wound. Each of the coil windings 102 is separated by a gap 132. In the illustrated embodiment, there are seven coil windings 102 wrapped around respective stator teeth 126. In other embodiments, there can be more than seven coil windings 102. A first stator end cap 130 is positioned on a front side of the stator frame 122 and second stator end cap 134 is positioned on a rear side of the stator frame 122. The first and second stator end caps 130, 134 may be integrally formed as a single piece (i.e., the stator frame 122) or, alternatively, may be two separate pieces that together to form the stator frame 122. In other embodiments, the stator 98 may include a gear disposed within an outer diameter of the stator lamination stack 124. The gear is configured to engage a pinion formed on the output drive assembly 30 to thereby drive the output drive assembly 30 for reciprocation.

Figure 8:
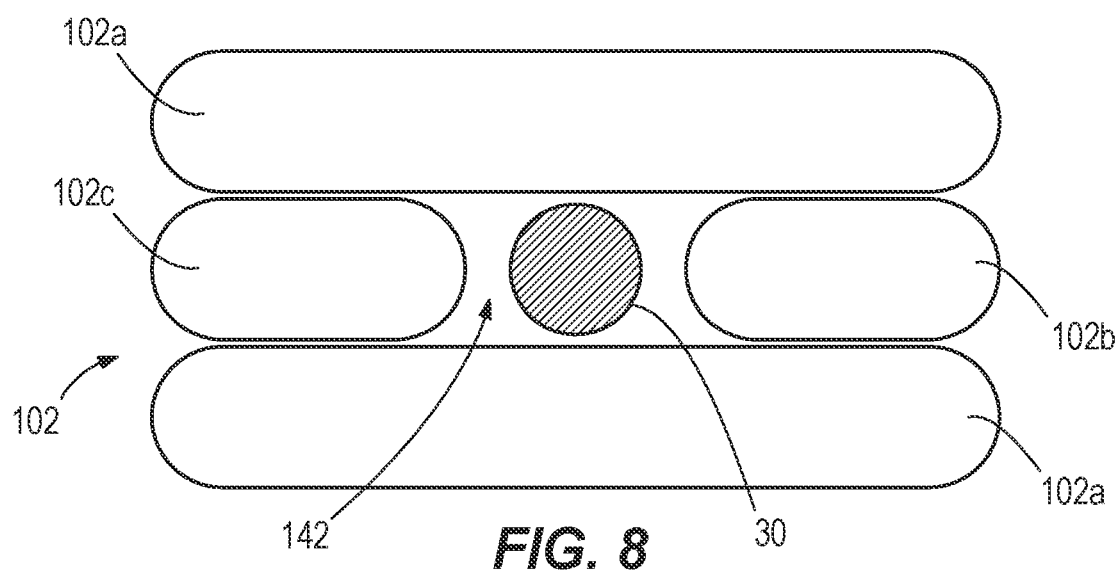
FIG. 8 is a schematic drawing of the plurality of coil windings of the motor of FIG. 7, with portions removed.

With reference to FIGS. 6-8, the stator frame 122 includes a central bore 138 extending through the stator frame 122 in a direction parallel to the motor axis 34 and an opening 142 extending through a side of the stator frame 122 in a direction perpendicular to the motor axis 34. In the illustrated embodiment, the opening 142 has a generally rectangular shape. In other embodiments, the opening 142 can be, but not limited to, a circular shape. The opening 142 is configured to receive at least a portion of the output drive assembly 30, so that the output drive assembly 30 can extend between and couple to the pin 64. In particular, a portion of the output shaft 46 and the U-shaped body 60 of the yoke 50 extends between the first and second rotor portions 106a, 106b such that the U-shaped body 60 receives the pin 64. The plurality of coil windings 102 includes a plurality of full-length coils 102a, which extend along the entire length of the stator frame 122, and a pair of shorter-length coils 102b, 102c disposed on opposite longitudinal sides of the opening 142. Two of the full-length coils 102a are respectively disposed on opposite sides of the shorter-length coils 102b, 102c. The shorter-length coils 102b, 102c each have a length that is less than a length of each full-length coil 102a. Specifically, in the illustrated embodiment, the length of each shorter-length coil 102b, 102c is half the length of each full-length coil 102a.

In operation of the power tool 10, the motor 26 is activated as a user depresses the trigger switch 42, causing the battery pack 40 to power the winding coils 102, thereby driving the rotor 106 and the motor shafts 116, 118 to rotate about the motor axis 34. Once the rotor 106 is rotating, the pin 64 coupled to the first and second rotor portions 106a, 106b also rotates eccentrically about the motor axis 34. The motion of the pin 64 then translates to the U-shaped body 60 of the yoke 50 which surrounds the pin 64 and the bearing 66. As such, the rotation motion of the pin 64 is translated into a reciprocating motion of the output shaft 46 since the U-shaped body 60 of the yoke 50 is integrally formed within the output shaft 46. The reciprocating motion of the output shaft 46 allows the user to perform cutting operations. The trigger 42 can then be released by the user to deactivate the motor 26 and stop the cutting operation.

Figure 9:
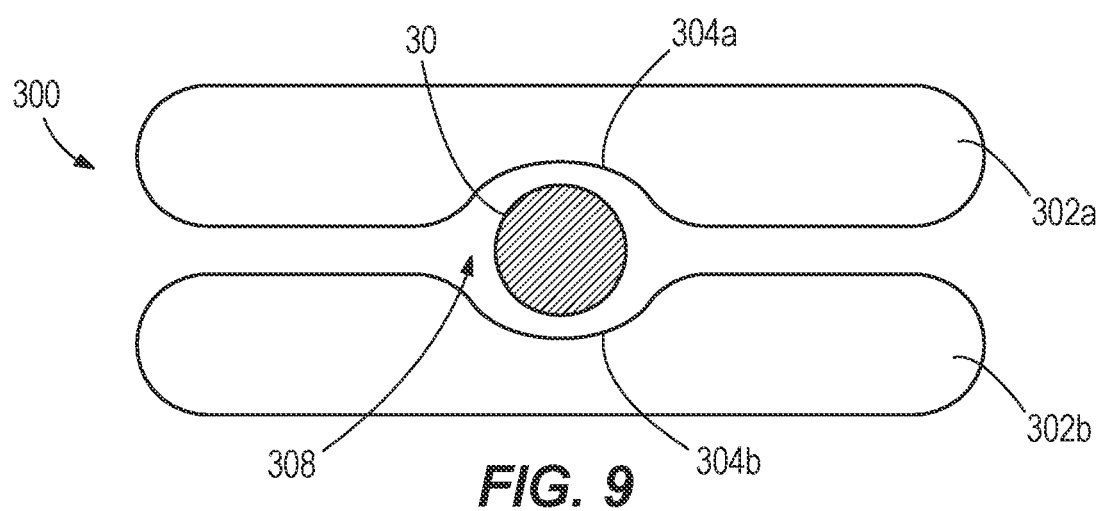
FIG. 9 is a schematic drawing of a motor including a plurality of coil windings in accordance with another embodiment of the disclosure.

FIG. 9 illustrates an alternative stator coil assembly 300 that may be incorporated into the motor 26. The illustrated stator coil assembly 200 includes a first coil winding 302a and a second coil winding 302b, each having a length substantially equal to the length of the stator frame 122. The first and second windings 302a, 302b are deflected or bent (e.g., via tabs on the stator teeth 126, not shown) to form respective concave portions 304a, 304b along the perimeters of the first and second windings 302a, 302b. The concave portions 304a, 304b are centered along the lengths of the first and second windings 302a, 302b. Once the first and second windings 302a, 302b are coupled to the stator frame 122 and positioned opposite each other, a gap 308 is formed between the concave portions 304a, 304b. The output drive assembly 30 extends through the gap 308 to the rotor (not shown).

Figure 10:
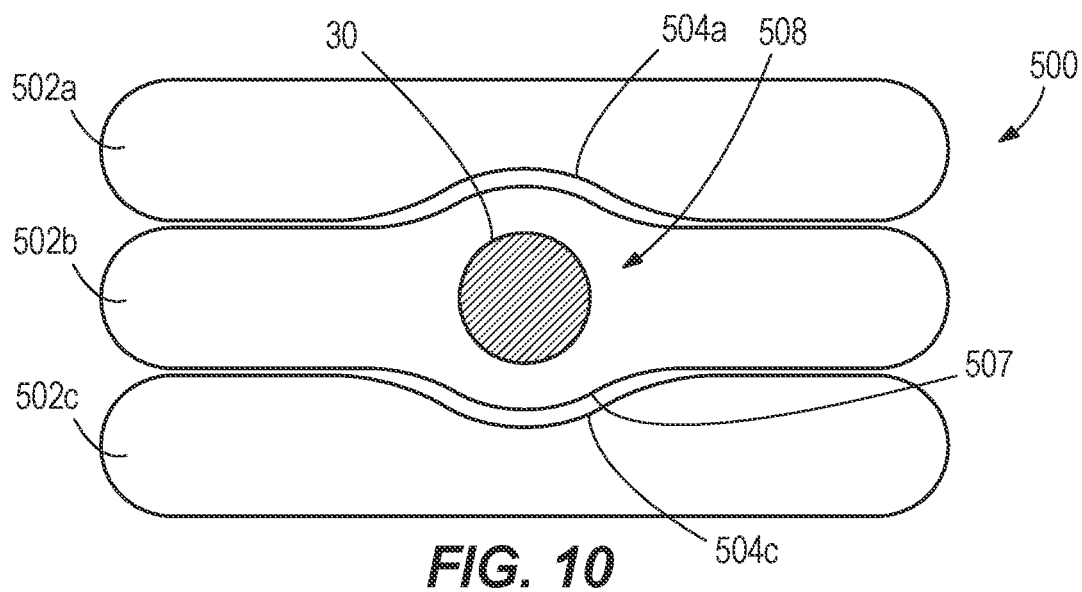
FIG. 10 is a schematic drawing of a motor including a plurality of coil windings in accordance with another embodiment of the disclosure.

FIG. 10 illustrates another alternative stator coil assembly 500 that may be incorporated into the motor 26. The illustrated stator coil assembly 500 includes a first coil winding 502a, a second coil winding 502b, and a third coil winding 502c. The second coil winding 502b is positioned between the first and third windings 502a, 502c. The second coil winding 502b includes a central convex region 507, in which the second coil winding 502b is bent outwardly (e.g., via tabs on the stator teeth 126, not shown) to define a gap 508, which accommodates the output drive assembly 30. The first and third windings 502a, 502c may also be deflected or bent inwardly to form respective concave portions 504a, 504c along the perimeters of the first and third windings 502a, 502c. The concave portions 504a, 504c are centered along the lengths of the first and third windings 502a, 502c, and aligned with the convex region 507 of the second winding 502b to provide spacing for the convex region 507.

Incorporating the embodiments of the motor 26 into the power tool 10 allows the output drive assembly 30 to be driven in a direction perpendicular to the motor 26, without requiring direction-changing gears, such as a bevel gear assembly. As such, the size of the power tool 10 is advantageously reduced. Although the motor 26 may be incorporated into a reciprocating saw, it should be understood that embodiments of the motor 26 may be advantageously incorporated into other types of power tools—including both rotary and reciprocating power tools—as well as a wide variety of other applications.

Although the disclosure has been described in detail with reference to certain preferred embodiments, variations and modifications exist within the scope and spirit of one or more independent aspects of the disclosure as described.

Various features and aspects of the present disclosure are set forth in the following claims.

What is claimed is:

1. A power tool comprising:
   a housing;
   a rechargeable battery pack coupled to the housing;
   a motor supported by the housing, the motor including
      a stator assembly having a stator frame with an opening extending therethrough and a plurality of coil windings configured to be selectively powered by the rechargeable battery pack, the plurality of coil windings positioned adjacent the opening of the stator frame, and
      a rotor assembly disposed within the stator assembly and configured to rotate as the plurality of coil windings are powered by the rechargeable battery pack; and
   an output drive assembly supported by the housing, the output drive assembly extends through the opening of the stator frame to be operably coupled to the rotor assembly.

2. The power tool of claim 1, wherein the rotor assembly includes a first rotor portion and a second rotor portion, and wherein the output drive assembly is at least partially disposed between the first and second rotor portions.

3. The power tool of claim 1, wherein the output drive assembly is operably coupled to the rotor assembly for reciprocating motion as the rotor assembly is driven to rotate.

4. The power tool of claim 1, wherein the stator frame of the stator assembly forms a plurality of teeth around which the plurality of coil windings are wound.

5. The power tool of claim 4, wherein the output drive assembly extends past the plurality of coil windings when coupled to the rotor assembly.

6. The power tool of claim 1, wherein the output drive assembly is a first output drive assembly extending from the motor in a first direction, and further comprising a second output drive assembly operably coupled to the rotor assembly and extending from the motor in a second direction different than the first direction.

7. The power tool of claim 1, wherein the motor is a brushless DC motor.

8. The power tool of claim 1, wherein the output drive assembly is configured to be coupled to a tool element.

9. A power tool comprising:
   a housing including a motor housing portion and a handle housing portion;

a rechargeable battery pack coupled to the handle housing portion;

a motor defining a motor axis and supported by the motor housing portion, the motor including a stator assembly forming a central bore, the stator assembly including a stator frame and a plurality of coil windings configured to be selectively powered by the rechargeable battery pack, the stator frame includes an opening extending therethrough in a direction perpendicular to the motor axis, and a rotor assembly extending through the central bore of the stator assembly and configured to rotate as the plurality of coil windings are powered by the rechargeable battery pack, the rotor assembly includes a first rotor portion and a second rotor portion with a gap defined therebetween; and an output drive assembly supported by the motor housing portion and defining an output drive axis oriented perpendicular to the motor axis, the output drive assembly extends through the opening of the stator frame and is at least partially disposed within the gap to be operably coupled to the rotor assembly.

10. The power tool of claim 9, wherein the output drive assembly includes:

an output shaft, a yoke integrally formed with the output shaft, and a pin disposed within the yoke and configured to couple the output drive assembly to the rotor assembly so that the output drive assembly reciprocates in a direction parallel to the output drive axis as the rotor assembly is driven to rotate.

11. The power tool of claim 9, wherein the plurality of coil windings includes a first coil winding and a second coil winding positioned adjacent the opening of the stator frame and opposite each other, such that at least a portion of the output drive assembly extends past the first and second coil windings when coupled to the rotor assembly.

12. The power tool of claim 11, wherein the plurality of coil windings includes a third coil winding and a fourth coil winding having a length sustainably equal to a length of the stator frame defined in a direction parallel to the motor axis, the first and second coil windings each having a length that is half the length of the third and fourth coil windings.

13. The power tool of claim 9, wherein the plurality of coil windings includes a first coil winding and a second coil winding having respective concave portions defined at a central portion of the first and second coil windings, the concave portions form a gap through which at least a portion of the output drive assembly extends when coupled to the rotor assembly.

14. The power tool of claim 9, wherein the plurality of coil windings includes a coil winding having an opening extending through a central portion of the coil winding, at least a portion of the output drive assembly extends through the opening of the coil winding when coupled to the rotor assembly.

15. The power tool of claim 9, wherein the motor is a brushless DC motor.

16. A power tool comprising:

a housing a rechargeable battery pack coupled to the housing;

a motor supported by the housing and configured to be selectively powered by the rechargeable battery pack for rotation, the motor including a stator assembly including a stator frame having an opening extending therethrough and a plurality of coil windings, the plurality of coil windings includes a first coil winding and a second coil winding that are disposed on opposite sides of the opening, and a rotor assembly disposed within the stator assembly and configured to rotate as the plurality of coil windings are powered by the rechargeable battery pack; and an output drive assembly supported by the housing, the output drive assembly extending through the opening of the stator assembly and past the first and second coil windings to be operably coupled to the rotor assembly for reciprocating motion in a direction perpendicular to the motor.

17. The power tool of claim 16, wherein the first coil winding has a first length and the second coil winding has a second length, and wherein the plurality of coil windings further includes a third coil winding having a third length substantially equal to a length of the stator assembly, the third length is greater than the first length and the second length.

18. The power tool of claim 17, wherein the plurality of coil windings further includes a fourth coil winding having a fourth length substantially equal to the third length, and wherein the third coil winding and the fourth coil winding are disposed on opposite sides of the first coil winding and the second coil winding.

19. The power tool of claim 17, wherein the first length of the first coil winding and the second length of the second coil winding are substantially equal to each other.

20. The power tool of claim 19, wherein the power tool is a portable reciprocating saw.

21. The power tool of claim 16, wherein the motor is a brushless DC motor.

* * * * *